(12) United States Patent
Chen

(10) Patent No.: US 12,405,485 B2
(45) Date of Patent: Sep. 2, 2025

(54) LENS REPLACEMENT ASSEMBLY OF EYEGLASSES

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

(*) Notice: Subject to any disclaimer, the term of this patent is extended or adjusted under 35 U.S.C. 154(b) by 445 days.

(21) Appl. No.: 17/888,859

(22) Filed: Aug. 16, 2022

(65) Prior Publication Data

US 2024/0061267 A1 Feb. 22, 2024

(51) Int. Cl.
*G02C 1/02* (2006.01)

(52) U.S. Cl.
CPC ......... *G02C 1/023* (2013.01); *G02C 2200/08* (2013.01)

(58) Field of Classification Search
CPC ...... G02C 1/023; G02C 2200/08; G02C 1/10; G02C 1/04
See application file for complete search history.

(56) References Cited

U.S. PATENT DOCUMENTS

| 2009/0079932 A1* | 3/2009 | Tsai | G02C 1/06 351/121 |
| 2015/0261007 A1* | 9/2015 | Li | G02C 1/04 351/106 |
| 2018/0164604 A1* | 6/2018 | Chen | G02C 5/12 |

FOREIGN PATENT DOCUMENTS

| DE | 4325297 A1 * | 2/1995 | G02C 1/04 |
| TW | M621457 U | 12/2021 | |

* cited by examiner

*Primary Examiner* — Bumsuk Won
*Assistant Examiner* — Ray Alexander Dean
(74) *Attorney, Agent, or Firm* — Rosenberg, Klein & Lee

(57) ABSTRACT

A lens replacement assembly of eyeglasses is provided. The lens replacement assembly includes a frame body and a lens. The frame body includes two lower frame portions, a nose-bridge portion, two corner portions, two side rods each of which is connected between the lower frame portion and the corner portion, and a hollow portion formed on each of the side rods. The lens is mounted in the lower frame portions, the nose-bridge portion and the corner portions and having extended positioning portions able to be locked and positioned by the hollow portions. Thereby stable positioning and quick replacement are achieved by multi-point locking and positioning as well as easy release of the lens from engagement by pulling.

7 Claims, 8 Drawing Sheets

LENS REPLACEMENT ASSEMBLY OF EYEGLASSES

BACKGROUND OF THE INVENTION

Field of the Invention

The present invention relates to a lens replacement assembly of eyeglasses, especially to a lens replacement assembly of eyeglasses which provides quick replacement of lenses without using tools.

Description of Related Art

Glasses have become one of our daily essentials now. Generally, there are various types of glasses which are classified into optical glasses, sunglasses, sports glasses, night vision glasses, etc. according to their uses and functions. Thus users usually have a plurality of pairs of glasses so that they select the glasses they need to wear according to timing and requirements in different surroundings. Most of consumers now have a plurality of glasses with different functions to meet their requirements in various occasions. For example, the glasses can help manage the brightness of light either indoors or outdoors. Or suitable lenses are worn to correct vision for far or near distance. The glasses with different frames are worn for aesthetics and style at different occasions.

The lenses and the frame of glasses available now are usually connected with each other by adhesive for firm fixation. Or an opening is disposed on the frame for allowing the lenses to be mounted and fastened therein. When users need to replace the frame or the lenses according to different occasions, uses, or requirements such as repairmen and maintenance, the frame is loosened by using tools such as screwdriver to remove the screws. After completing the replacement, the screws are fastened again. The replacement process takes time and labor. Thereby glasses with quick and easy assembly and disassembly design have been developed such as a lens replacement assembly of eyeglasses for replacement of a lens revealed in Taiwanese Pat. Pub. No. M621457U. The lens replacement assembly includes a frame with at least one main body. The main body of the frame consists of an insertion portion, a locking portion pivotally connected with one side of the insertion portion, and a recess portion arranged at the other side of the insertion portion. The lens has at least one lens body provided with a locking member on an outer edge thereof. The locking member is inserted into the insertion portion while the locking portion is working together with the insertion portion to fix the lens body in the frame. When the lens is connected and fixed with the main body of the frame, the outer edge of the lens body is engaged with the recess portion.

Although the above glasses can achieve quick release and change of the frames and lenses, connectors (such as screws) are still required for positioning fastening parts during the operation and assembly process. The design is not ideal while in use. Thus there is room for improvement and there is a need to provide a pair of glasses with novel design for overcoming the shortcomings mentioned above.

SUMMARY OF THE INVENTION

Therefore, it is a primary object of the present invention to provide a lens replacement assembly of eyeglasses by which a lens is not only able to be replaced quickly but also engaged in a frame body firmly.

In order to achieve the above object, a lens replacement assembly of eyeglasses is revealed. The lens replacement assembly includes a frame body and a lens. The frame body includes two lower frame portions, a nose-bridge portion, two corner portions, two side rods each of which is connected between the lower frame portion and the corner portion, and a hollow portion formed on each of the side rods. The lens which is mounted in the lower frame portions, the nose-bridge portion and the corner portions is provided with two extended positioning portions able to be engaged with the hollow portions correspondingly. Thereby stable positioning and quick replacement of the lens are achieved by multi-point locking and positioning as well as easy release of the lens from engaged positions by pulling.

Preferably, a first groove is arranged at and integrally communicating between each of the lower frame portions and the nose-bridge portion correspondingly while the corner portion is provided with a second groove. The first groove on the nose-bridge portion is provided with a first mounting recess and the lens is provided with a first protruding member corresponding to the first mounting recess.

Preferably, the hollow portion formed on the side rod is located at the position corresponding to the first and the second grooves while the lens is provided with extended positioning portions corresponding to the hollow portions and able to be engaged with the hollow portions.

Preferably, a second mounting recess is arranged at the second groove on the corner portion while a lens portion of the lens is provided with a second protruding member corresponding to the second mounting recess and able to be mounted into the second mounting recess.

Preferably, an outer end of the corner portion is pivotally connected with a temple.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
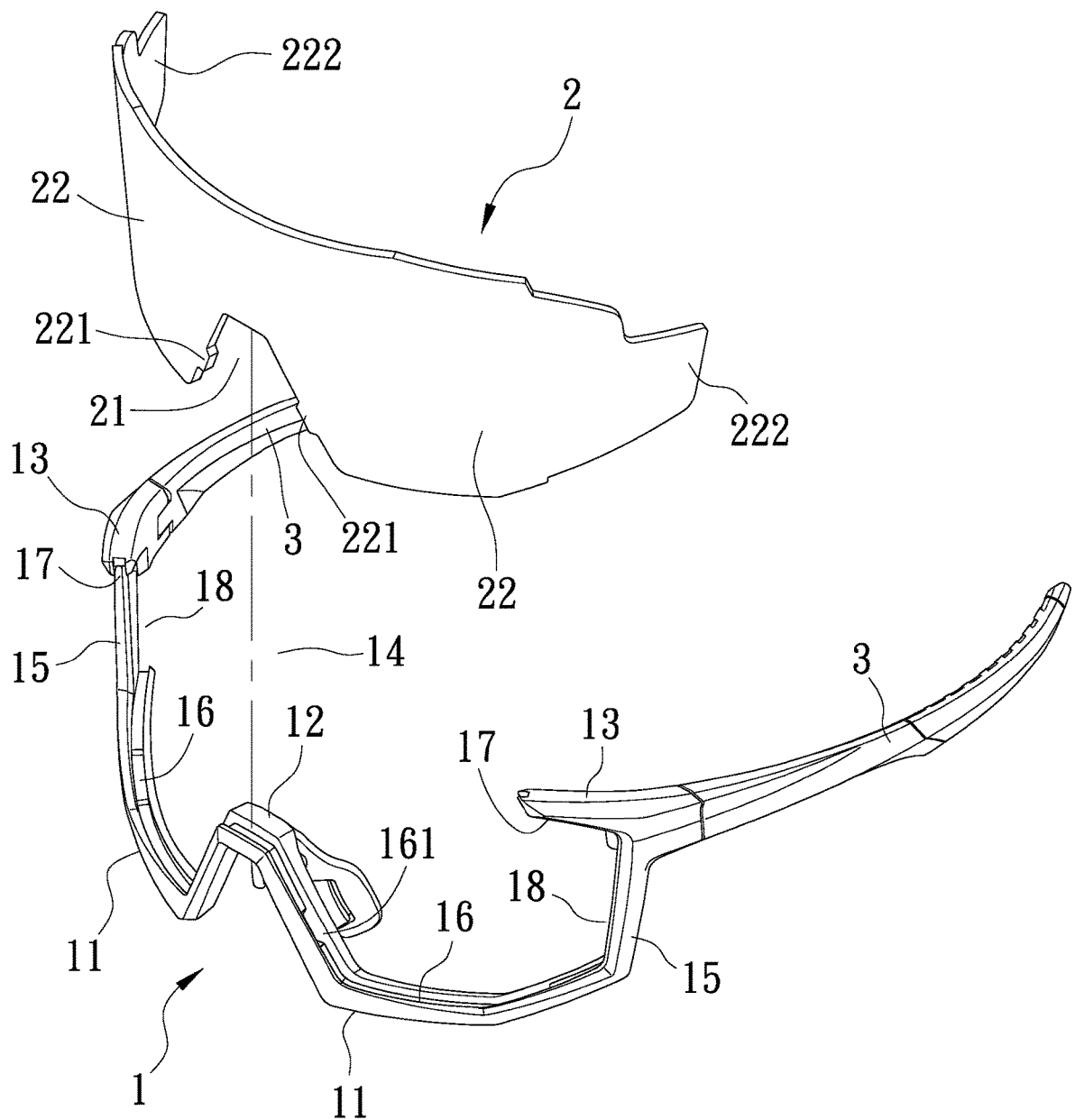
FIG. 1 is an exploded view of an embodiment according to the present invention.

As shown in FIG. 1, a lens replacement assembly of glasses according to the present invention includes a frame body 1 and a lens 2.

The frame body 1 consists of two lower frame portions 11, a nose-bridge portion 12 which connects the two lower frame portions 11, a corner portion 13 disposed on an outer side of each of the lower frame portions 11, an open portion 14 located between the two corner portions 13, two side rods 15 each of which is connected between the lower frame portion 11 and the corner portion 13 correspondingly, two first grooves 16 each of which is disposed on the lower frame portion 11 and the nose-bridge portion 12 and integrally communicating between the lower frame portion 11 and the nose-bridge portion 12 correspondingly, a second groove 17 disposed on each of the corner portions 13, and a hollow portion 18 formed on each of the side rods 15 and corresponding to the first and the second grooves 16, 17. The first groove 16 on the nose-bridge portion 12 is provided with a first mounting recess 161.

The lens 2 is composed of a notched portion 21 corresponding to the nose-bridge portion 12 and two lens portions 22 (a left lens portion and a right lens portion) divided by the notched portion 21 and able to be mounted into the first and the second grooves 16, 17 of the lower frame portions 11 correspondingly. The lens portion 22 is provided with a first protruding member 221 corresponding to the first mounting recess 161 and an extended positioning portion 222 located at an outer side of the lens portion 22 and corresponding to the hollow portion 18 on the side rod 15. The extended positioning portion 222 is inserted through and protruding from the hollow portion 18.

Figure 3:
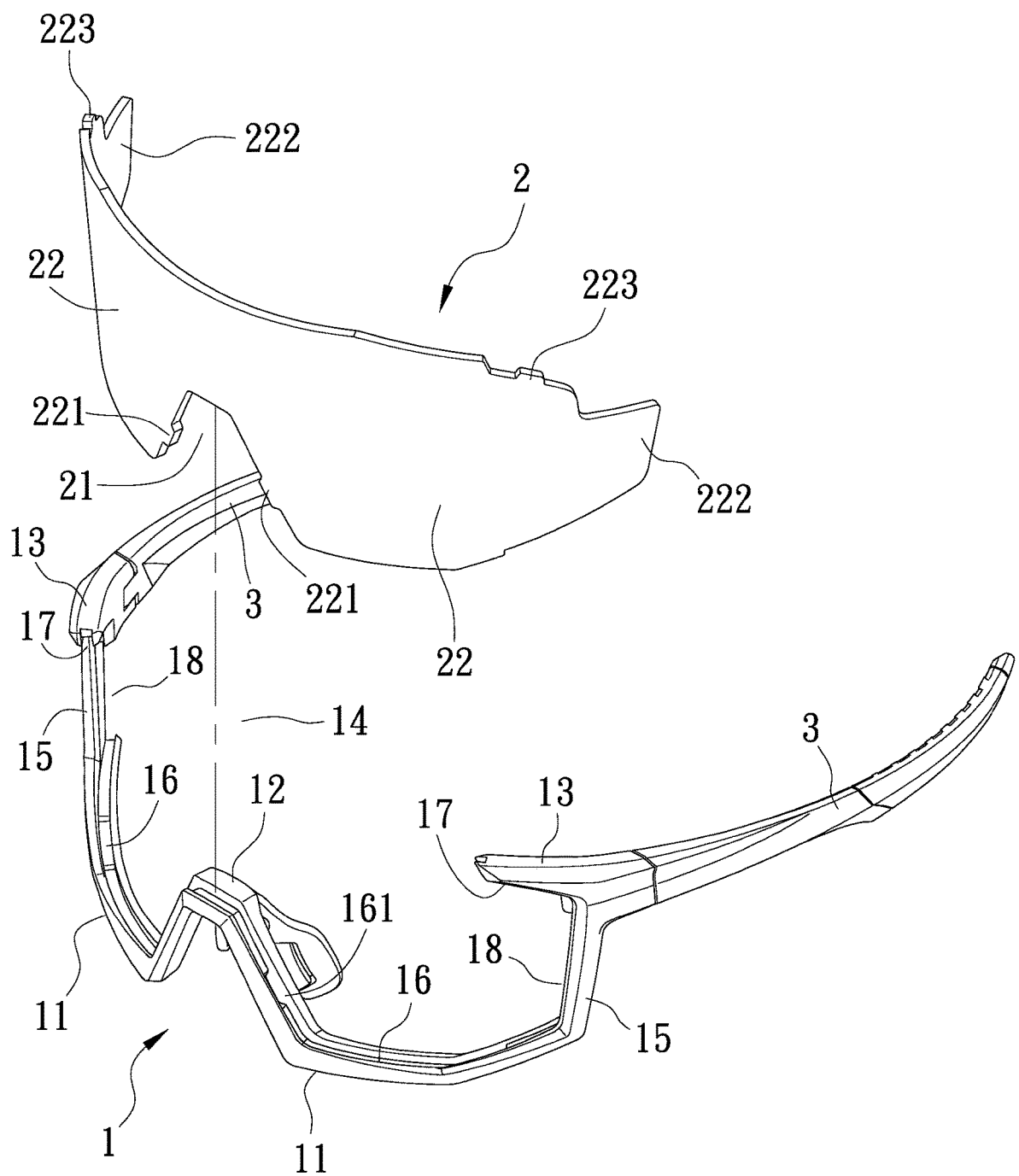
FIG. 3 is an exploded view of another embodiment according to the present invention.
Figure 4:
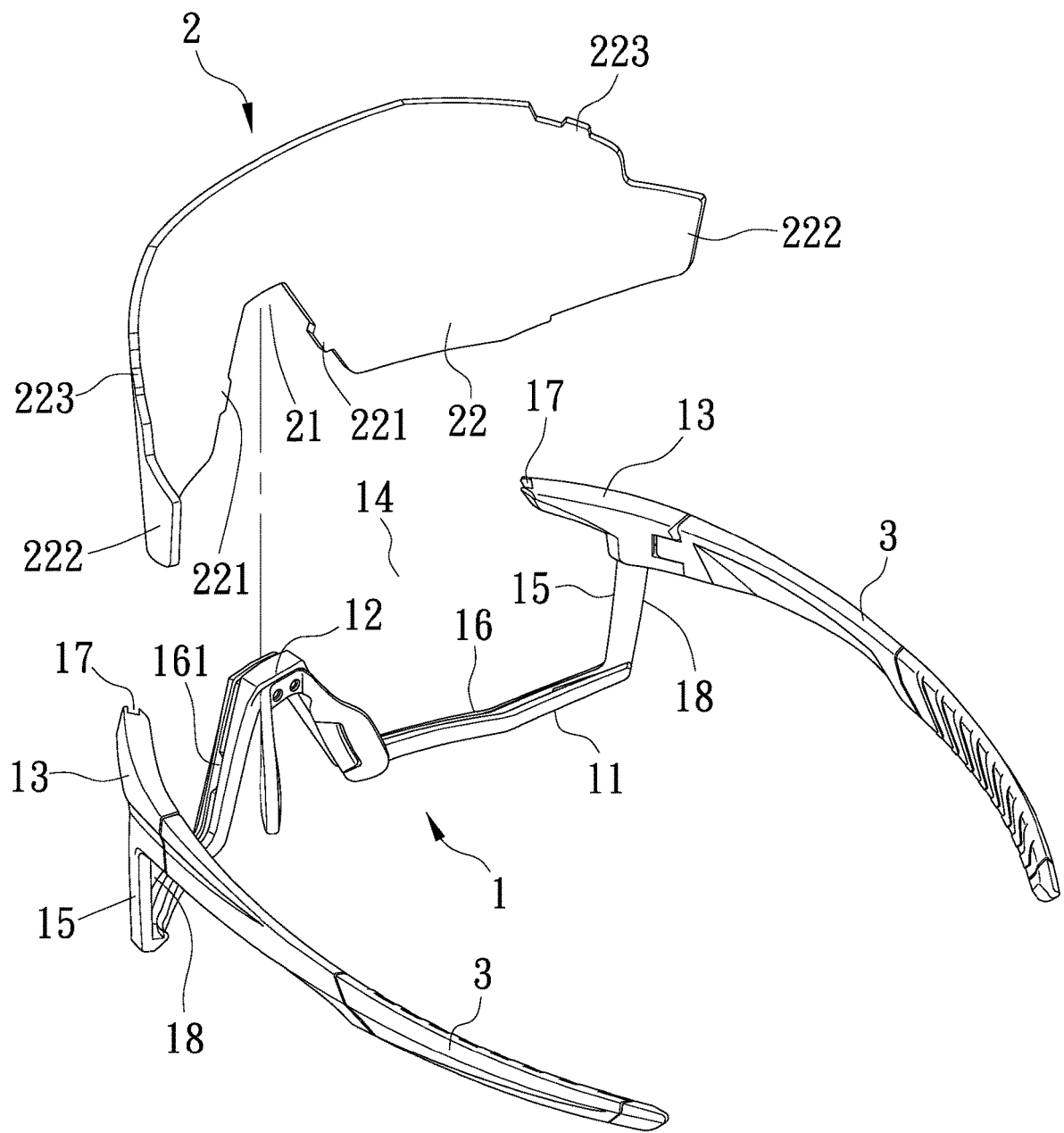
FIG. 4 is an exploded view of another embodiment viewed from another angle according to the present invention.
Figure 5:
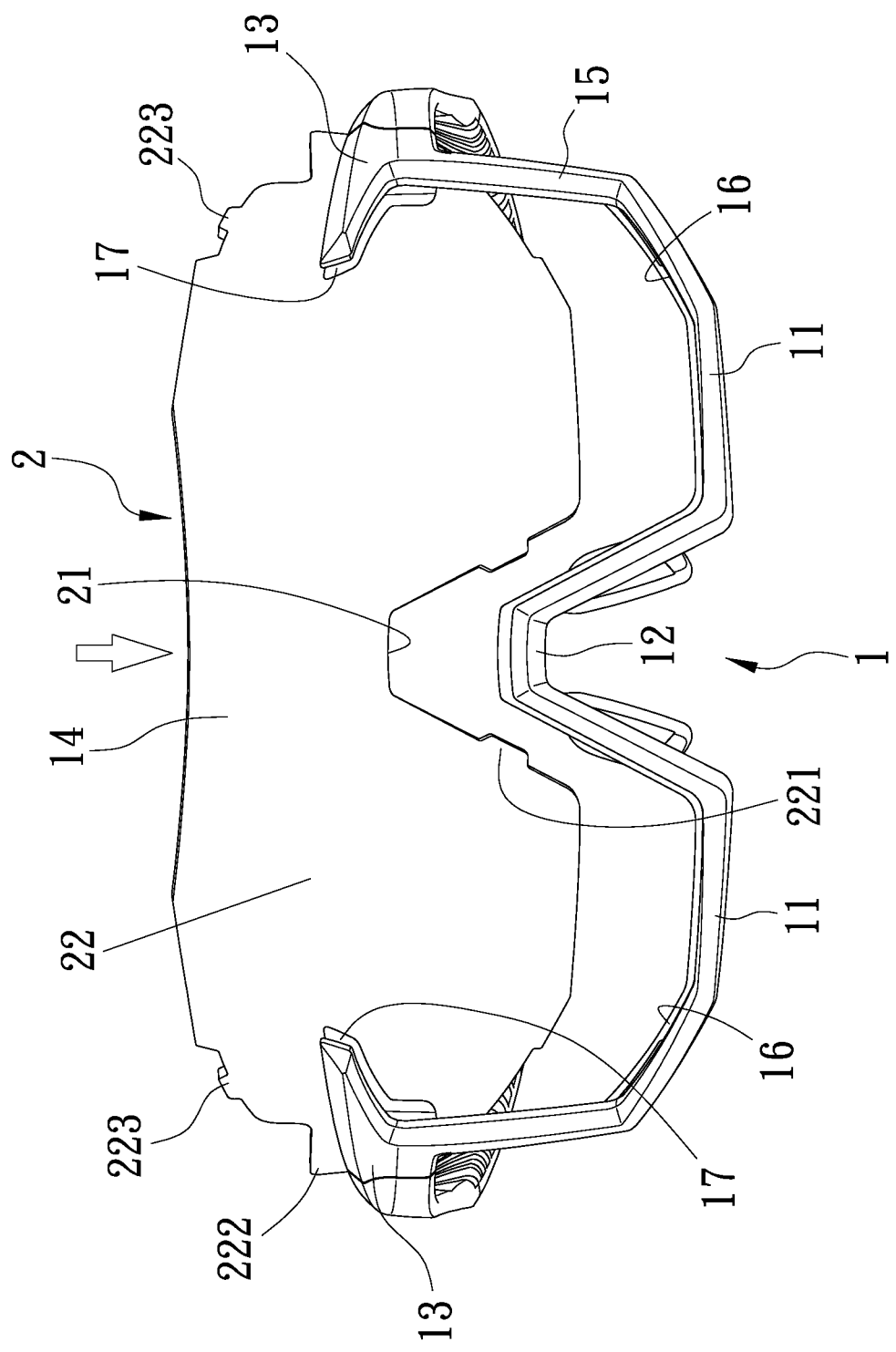
FIG. 5 is a schematic drawing showing assembling of a lens of an embodiment according to the present invention.
Figure 6:
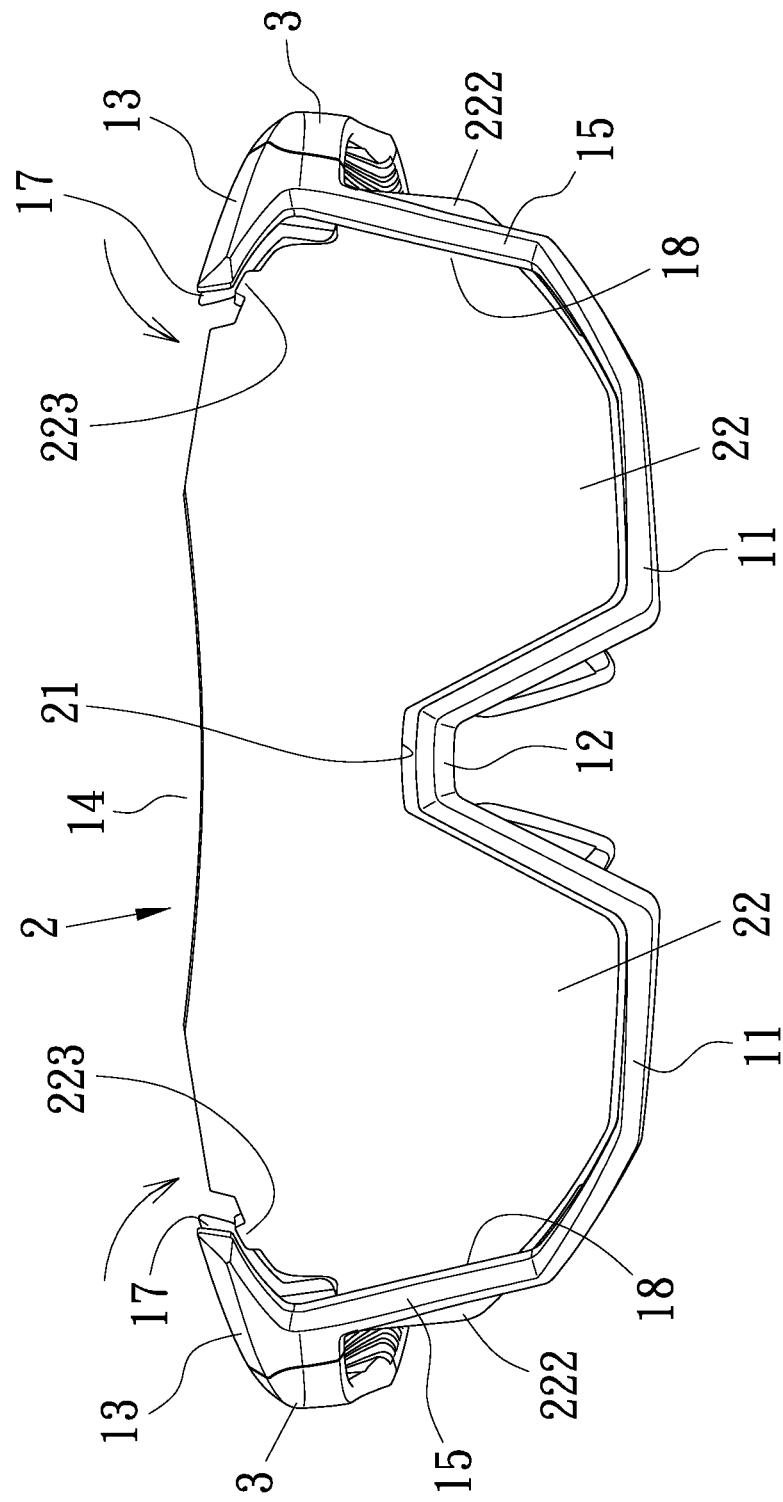
FIG. 6 is another schematic drawing showing assembling of a lens of an embodiment according to the present invention.
Figure 7:
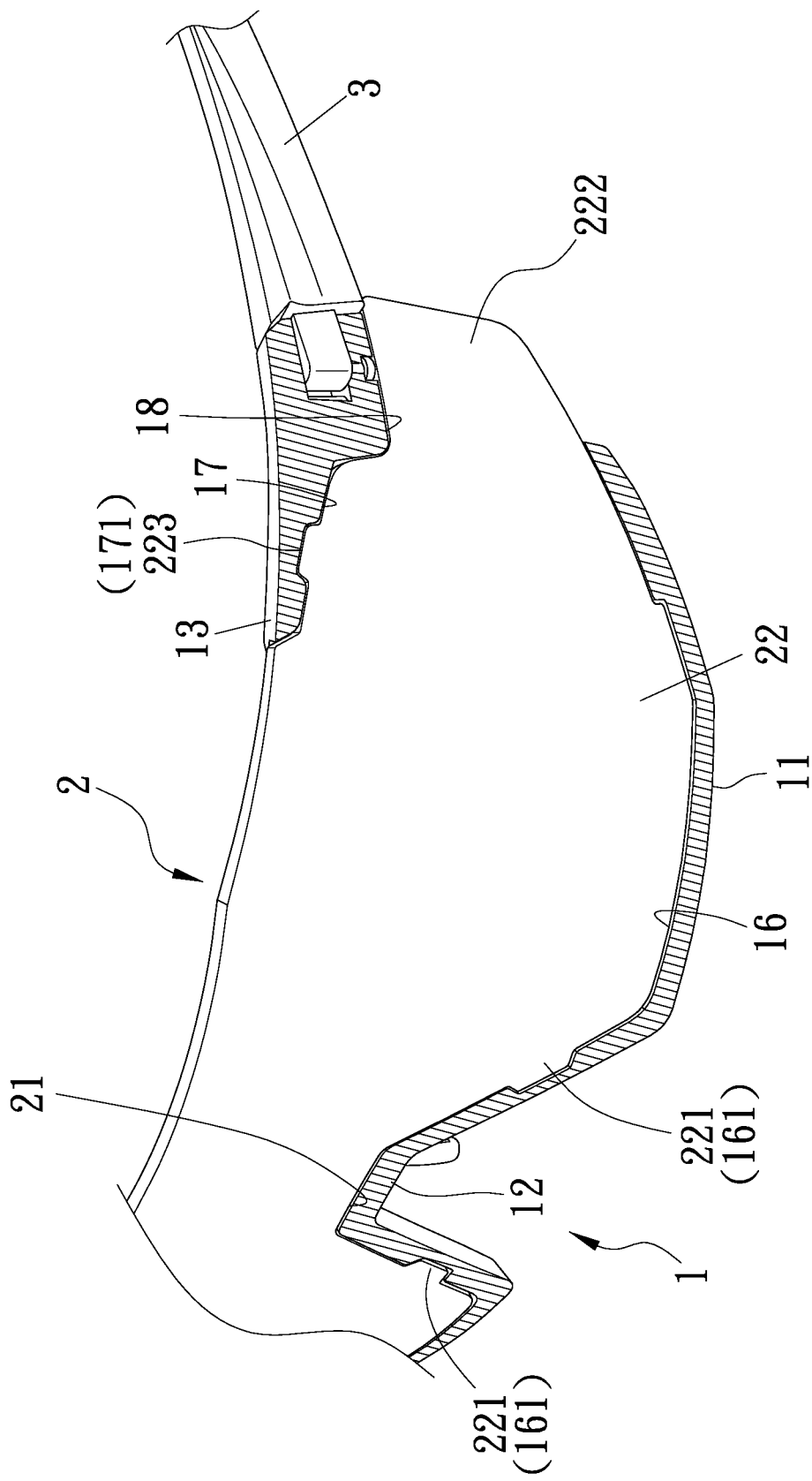
FIG. 7 is a schematic drawing showing a partial sectional view of another embodiment according to the present invention.
Figure 8:
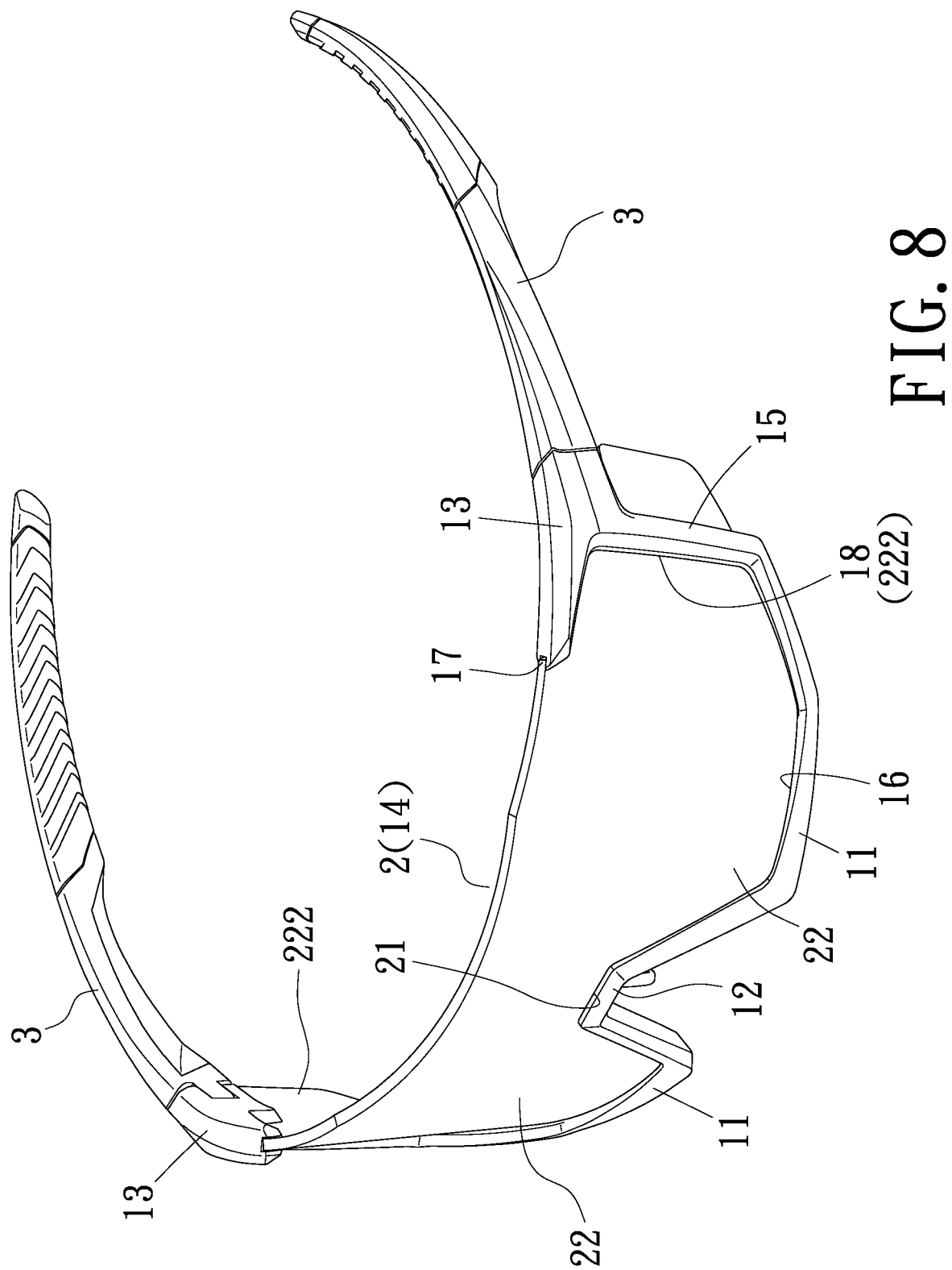
FIG. 8 is a perspective view of an embodiment according to the present invention.

While in use, the lens 2 used is a one-pieced lens while an outer end of the corner portion 13 is pivotally connected with a temple 3. In consideration of stable and firm mounting of the lens 2, the second groove 17 on the corner portion 13 is provided with a second mounting recess 171 while each of the lens portions 22 is provided with a second protruding member 223 at the position corresponding to the second mounting recess 171, as shown in FIG. 3, FIG. 4, and FIG. 7.

Figure 2:
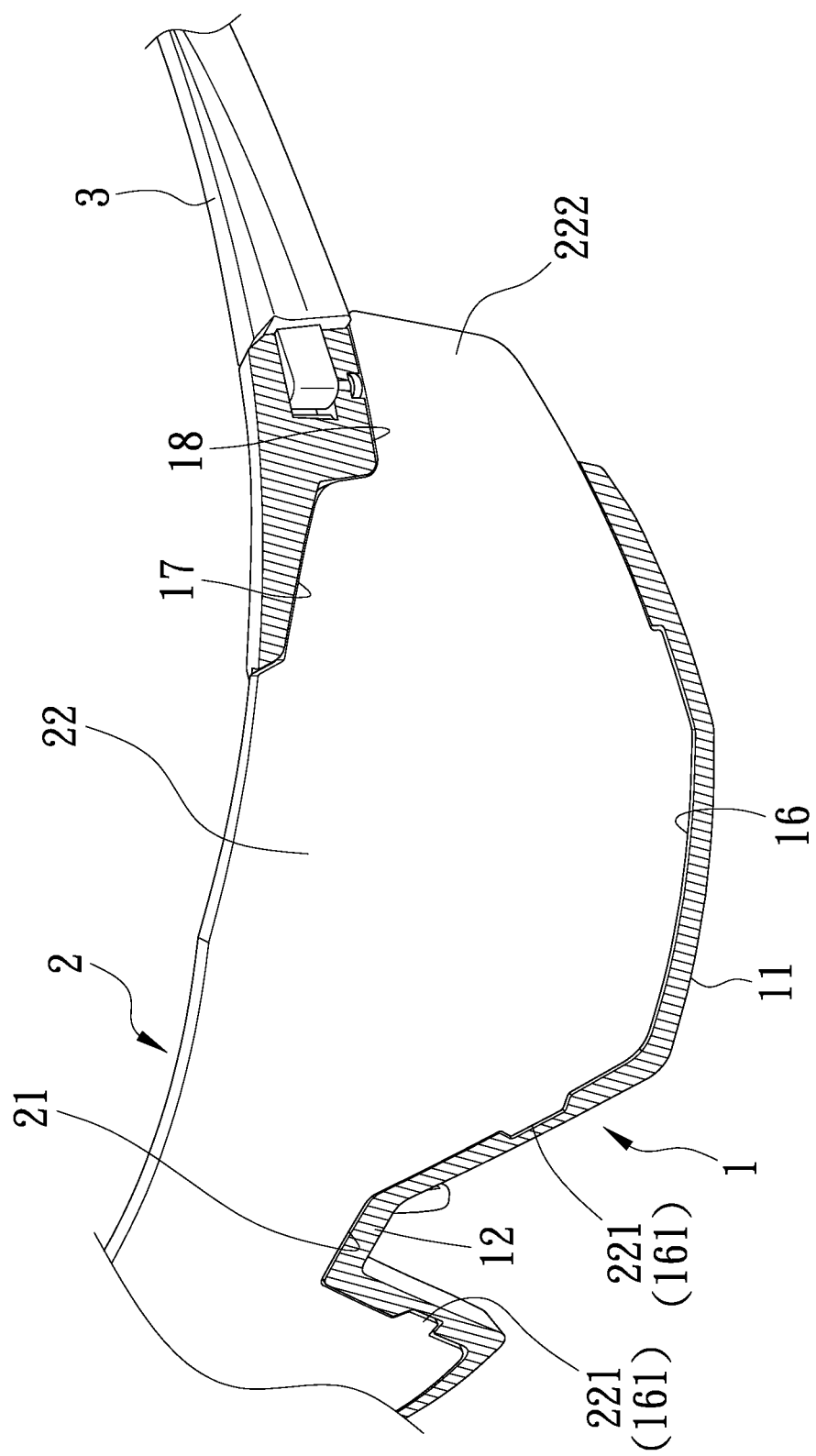
FIG. 2 is a schematic drawing showing a partial sectional view of an embodiment according to the present invention.

In order to assemble the lens 2 with the frame body 1, as shown in FIG. 1-8, the lens 2 is inclined a certain angle and mounted into the frame body 1 through the open portion 14 on an inner surface of the frame body 1. The left and right lens portions 22 are firstly mounted into the first grooves 16 correspondingly while the notched portion 21 of the lens 2 and the nose-bridge portion 12 are aligned with each other. At the same time, the first protruding members 221 of the lens portions 22 are mounted and locked in the first mounting recesses 161. Then the extended positioning portions 222 of the lens portions 22 are guided to be inserted through and protruding from the hollow portions 18 on the side rods 15 correspondingly. The extended positioning portions 222 are engaged with the hollow portions 18. As shown in FIG. 2, a top edge of the lens portion 22 of the lens 2 is mounted into the second groove 17 on the corner portion 13 for positioning. The lens 2 is further fixed and positioned firmly by the two second protruding members 223 of the lens portions 22 mounted into the second mounting recesses 171 of the second grooves 17 correspondingly, as shown in FIG. 4-8.

In order to replace the lens 2 with a new one, users can pull the corner portion 13 out a bit so that the second protruding member 223 of the lens portion 22 is released from the second mounting recess 171 of the second groove 17 and the second groove 17. Then the extended positioning portion 222 is pulled away from the hollow portion 18. Thereby the lens 2 can be removed from the first grooves 16 on both the lower frame portions 11 and the nose-bridge portion 12 quickly and easily. After completing disassembly of the original lens 2, a new lens is assembled according to the procedure mentioned above. Thus quick replacement of the lens 2 is achieved.

In summary, the lens replacement assembly of glasses according to the present invention has the following advantages compared with the techniques available now.

1. The lens is firmly secured and positioned in the frame body in a three-point fixing manner by the first protruding members mounted and locked in the first mounting recesses, the extended positioning portions locked in the hollow portions, and the second protruding members engaged with the second mounting recesses.

2. No tool is required and the original lens is quickly released from the engagement by being pulled out of and away from the frame body. Thus quick replacement of the lens is achieved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A lens replacement assembly of eyeglasses comprising:
    a frame body which includes:
        two lower frame portions,
        a nose-bridge portion connecting the two lower frame portions,
        two corner portions each disposed on an outer side of a corresponding one of the lower frame portions,
        an open portion located between the two corner portions,
        two side rods each connected between a corresponding one of the lower frame portions and a corresponding one of the corner portions,
        two first grooves each disposed on a corresponding one of the lower frame portions and the nose-bridge portion, each first groove integrally communicating between the corresponding lower frame portions and the nose-bridge portion, each first groove being provided with a first mounting recess on the nose-bridge portion,
        two second grooves each disposed on a corresponding one of the corner portions, and
        two hollow portions each formed on a corresponding one of the side rods and aligned to the corresponding first groove and the second groove; and
    a lens which includes;
        a notched portion corresponding to the nose-bridge portion, and
        two lens portions divided by the notched portion and configured to be mounted into the first groove and the second groove of a corresponding one of the lower frame portions,
    wherein each lens portion is provided with:
        a first protruding member corresponding to the first mounting recess of the corresponding first groove, and
        an extended positioning portion located at an outer side of the lens portion and corresponding to the hollow portion on the corresponding side rod, and
    wherein each extended positioning portion is configured to be inserted through and protruding from the corresponding hollow portion.

2. The lens replacement assembly of eyeglasses as claimed in claim 1, wherein a second mounting recess is arranged at the second groove on each corner portion, and wherein each lens portion is provided with a second protruding member corresponding to the second mounting recess of the corresponding corner portion and configured to be engaged with the second mounting recess.

3. The lens replacement assembly of eyeglasses as claimed in claim 1, wherein an outer end of each corner portion is pivotally connected with a corresponding temple.

4. The lens replacement assembly of eyeglasses as claimed in claim 2, wherein an outer end of each corner portion is pivotally connected with a corresponding temple.

5. The lens replacement assembly of eyeglasses as claimed in claim 1, wherein each corner portion extends inward from the corresponding side rod.

6. The lens replacement assembly of eyeglasses as claimed in claim 1, wherein each corner portion is integrally connected to the corresponding lower frame portion.

7. The lens replacement assembly of eyeglasses as claimed in claim 1, wherein each side rod is integrally connected between the corresponding corner portion and the corresponding lower frame portion.

* * * * *